(12) United States Patent
Browne et al.

(10) Patent No.: US 9,292,303 B2
(45) Date of Patent: Mar. 22, 2016

(54) SUSPEND PROFILES AND HINTED SUSPENDING

(75) Inventors: Michael E. Browne, Staatsburg, NY (US); Eli M. Dow, Poughkeepsie, NY (US); Marie R. Laser, Poughkeepsie, NY (US); Jessie Yu, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 1933 days.

(21) Appl. No.: 12/177,450

(22) Filed: Jul. 22, 2008

(65) Prior Publication Data
US 2010/0023944 A1    Jan. 28, 2010

(51) Int. Cl.
G06F 9/455    (2006.01)
G06F 9/46     (2006.01)
G06F 9/44     (2006.01)

(52) U.S. Cl.
CPC .................................. G06F 9/4418 (2013.01)

(58) Field of Classification Search
USPC ........................................ 718/100; 713/323
See application file for complete search history.

(56) References Cited

U.S. PATENT DOCUMENTS

| | | | | |
|---|---|---|---|---|
| 5,828,568 A | * | 10/1998 | Sunakawa et al. | 700/79 |
| 6,065,123 A | * | 5/2000 | Chou et al. | 713/322 |
| 6,192,388 B1 | | 2/2001 | Cajolet | |
| 6,567,709 B1 | * | 5/2003 | Malm et al. | 700/21 |
| 7,225,446 B2 | * | 5/2007 | Whitton | 718/108 |
| 2003/0061383 A1 | * | 3/2003 | Zilka | 709/245 |
| 2003/0084087 A1 | | 5/2003 | Berry | |
| 2006/0190938 A1 | * | 8/2006 | Capek et al. | 717/161 |
| 2007/0033593 A1 | * | 2/2007 | Myers et al. | 718/108 |
| 2008/0005599 A1 | * | 1/2008 | Theocharous et al. | 713/300 |

OTHER PUBLICATIONS

Kondo et al.; Characterizing resource availability in enterprize desktop grids; Jan. 2007.*
Appino, et al. Personal Computer Environmental Control Via a Proximity Sensor, TDB v36 n8 08-93 p. 343-346.

* cited by examiner

*Primary Examiner* — Corey S Faherty
(74) *Attorney, Agent, or Firm* — Cantor Colburn LLP; Steven Chiu

(57) ABSTRACT

Methods, systems and computer program products for suspend profiles and hinted suspending. Exemplary embodiments include a suspend mode management method, including determining a task to perform in the computer system during a suspend period of the computer system, detecting a suspend event in the computer system, the suspend event initiating the suspend period and performing the task during the suspend period.

18 Claims, 3 Drawing Sheets

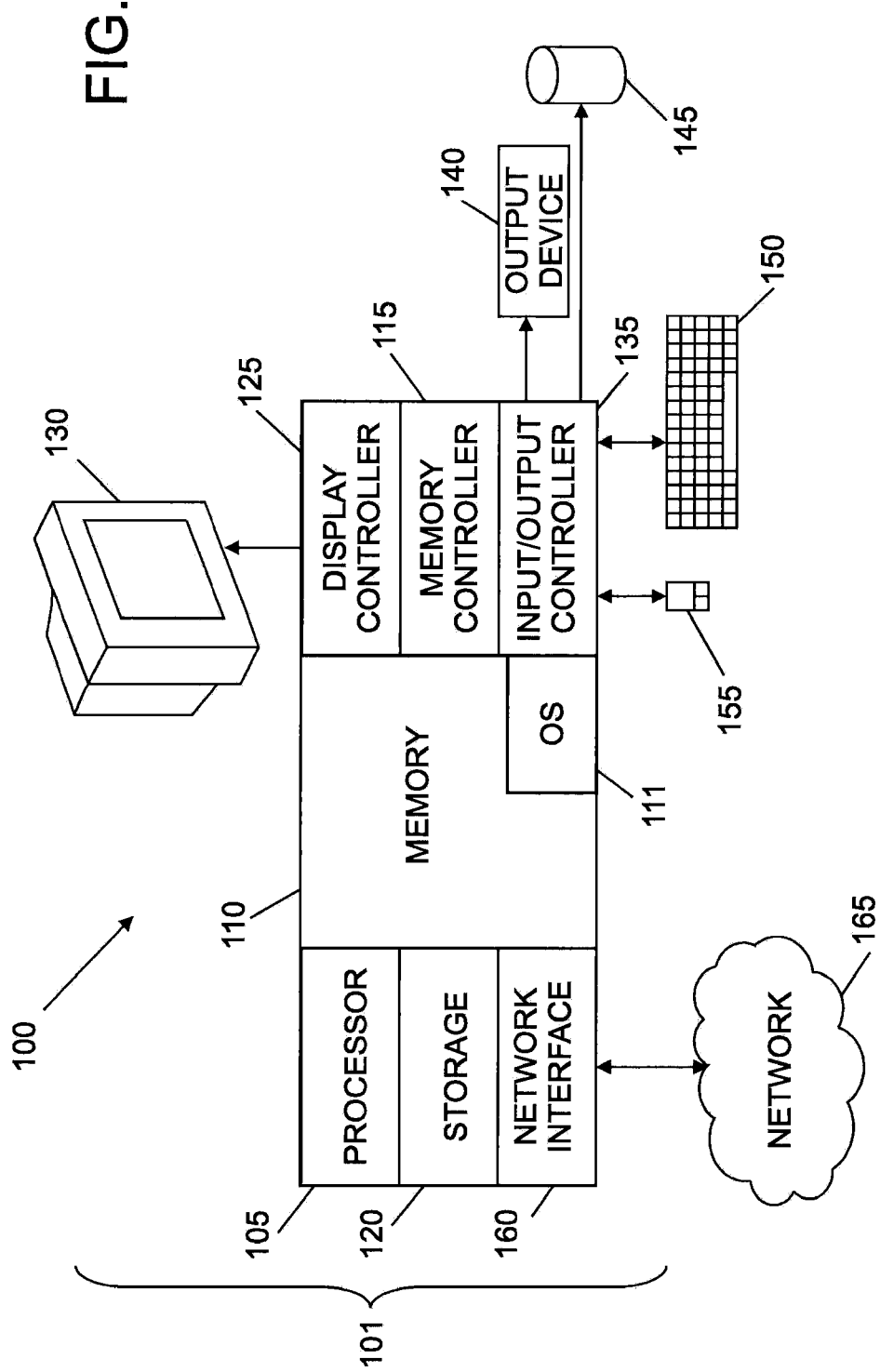

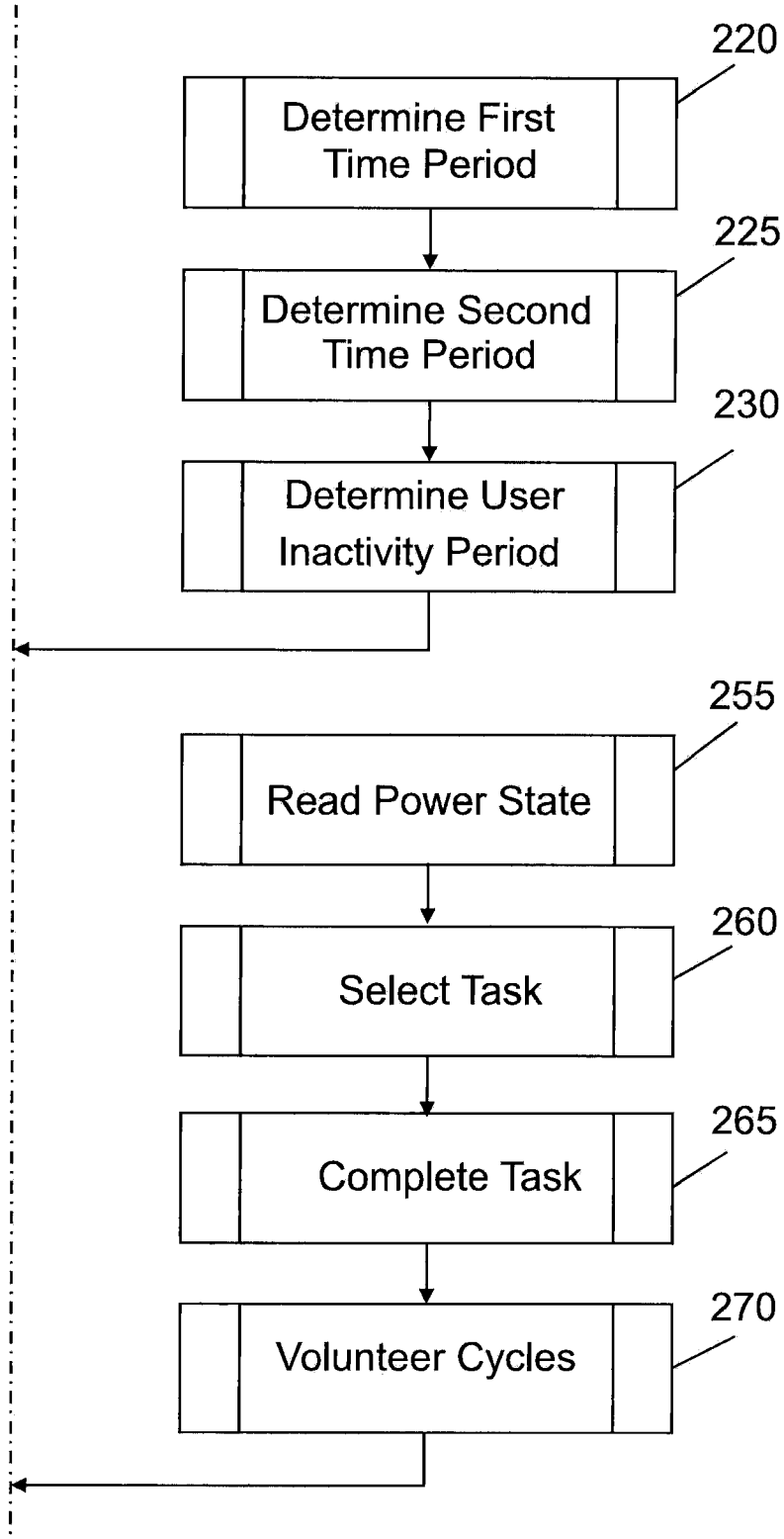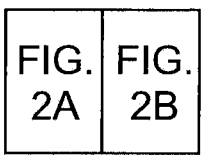

SUSPEND PROFILES AND HINTED SUSPENDING

BACKGROUND

This invention relates generally to computer suspension, and more particularly to methods, systems and computer program products for suspend profiles and hinted suspending.

Currently, suspend or hibernation capabilities are included with portable computers and embedded systems. For example, when used by home users a laptop might be suspended for a long car ride home, or for a flight. Often, these devices implement suspend features in a fashion designed strictly to save power and does not consider other possibilities that the user might want to occur during the suspend period. Additionally, user space applications might not be able to tolerate traditional suspend capabilities properly.

BRIEF SUMMARY

Exemplary embodiments include a suspend mode management method, including determining a task to perform in the computer system during a suspend period of the computer system, detecting a suspend event in the computer system, the suspend event initiating the suspend period and performing the task during the suspend period.

Additional exemplary embodiments include a computer system, including a processor, an input device operatively coupled to the processor and a suspend period management process, having instructions to generate hinted suspending that indicates the commencement of a period of user inactivity, perform a task from a pool of deferrable work tasks during the period of user inactivity and generate a suspend profile that includes a record for the period of user inactivity, and a time of day in which the period of user inactivity occurs.

Further exemplary embodiments include a computer program product for providing suspend mode management to a computer system having an input device, the computer program product including instructions for causing a computer to implement a method, the method including determining a task to perform in the computer system during a suspend period of the computer system, detecting a suspend event in the computer system, the suspend event initiating the suspend period and performing the task during the suspend period.

BRIEF DESCRIPTION OF THE SEVERAL VIEWS OF THE DRAWINGS

Referring now to the drawings wherein like elements are numbered alike in the several FIGURES:

FIG. 1 illustrates an exemplary embodiment of a system for generating suspend profiles and hinted suspending.

DETAILED DESCRIPTION

Figure 2A:
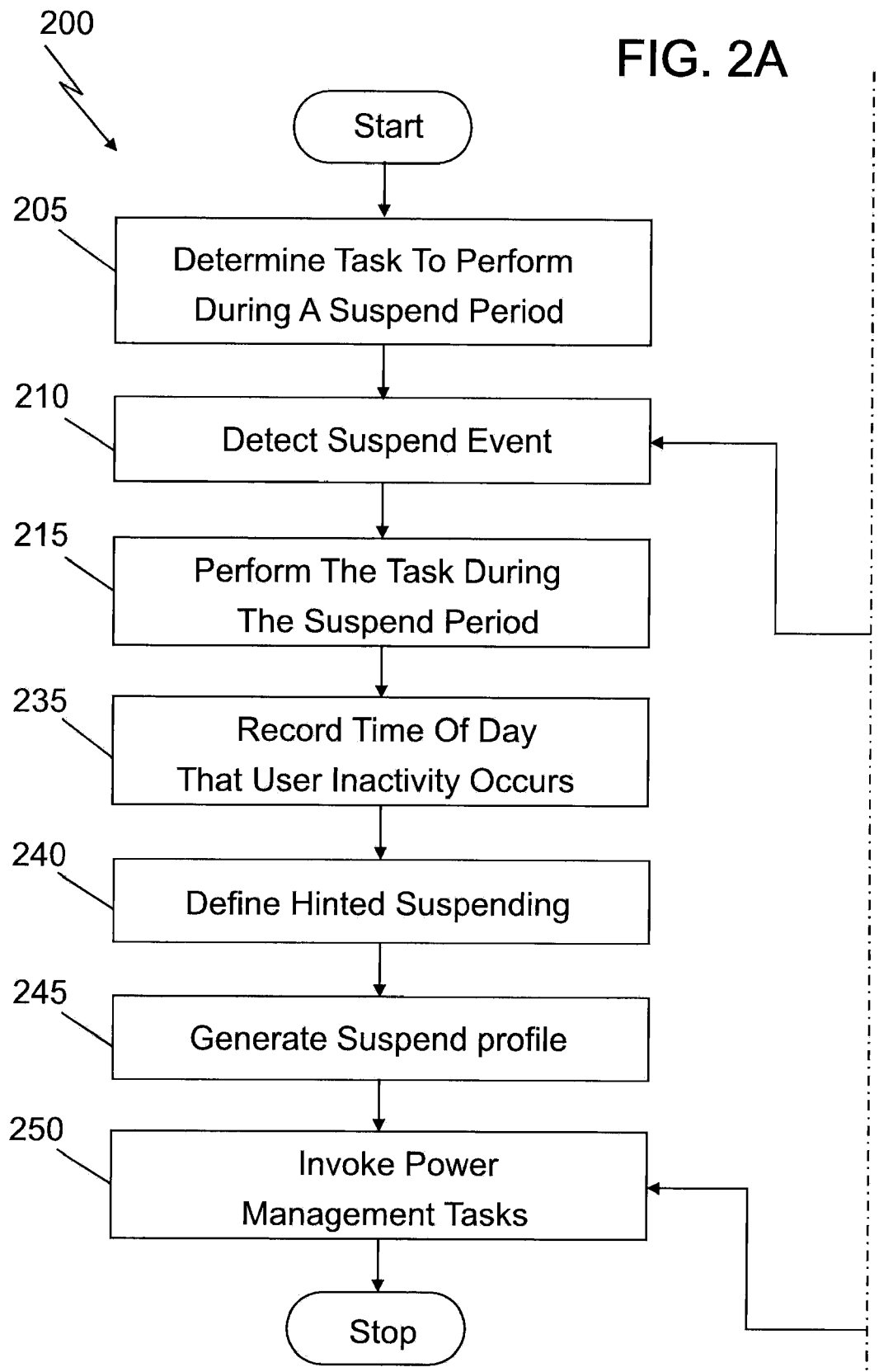
FIG. 2 illustrates a flow chart of a method for generating suspend profiles and hinted suspending in accordance with exemplary embodiments.

Exemplary embodiments include methods, systems and computer program products that generate a user profile by monitoring/observing user behavior while the user is engaging the computer. For example, computer can monitor events such as the time period in between uses of a mouse, keyboard, or other input device class. In exemplary embodiments, the methods, systems and computer program products described herein may also include vendor provided default profiles for corporate users or new systems etc. The computer can further record the time of day and whether the time periods of non-use occur at the same time period each day. In addition, the computer can schedule tasks for the periods of non-use. As such, the computer can track the user patterns and schedule other events accordingly. As described above, the methods, systems and computer program products described herein implement scheduled tasks during suspend periods. It is appreciated that although the methods, systems and computer program products described herein can also be implemented during sleep/hibernate periods, the methods, systems and computer program products described herein respect the hibernate periods because the hibernate periods are a deliberate attempt to save power. As such, in exemplary embodiments, it is desirable to perform the tasks described herein during suspend periods where the machine is plugged in and at full power. For example, the computer system may include a power policy to never start work when a battery needs to be charged. As such, the determination of a suspend period is combined with a determination of the power state of a computer system to determine appropriate workloads for execution in given periods.

In exemplary embodiments, the methods, systems and computer products described herein define hinted suspending, which is an event that indicates that a suspend period is going to occur. The suspend period can be defined by dynamically tracking prior suspend periods that have occurs over an extended time period, such as several hours, days, weeks or months. As such, the methods, systems and computer program products described herein can determine and predict not only when a suspend period is about to commence but also the time in which the suspend period lasts. In exemplary embodiments, hinted suspending can warn an operating system of a computer that a suspend event is about to occur, and can further alert the operating system to take necessary action to provide the best possible user experience. Additionally, the methods, systems and computer program products described herein can construct suspend profiles covering several suspend hints grouped together for convenience or based on some other commonality.

In exemplary embodiments, there can be several event interpretations. For example, the methods, systems and computer program products described herein can implement a profile to guess when a "non-explicit" event occurs, such as the user closing the lid, which triggers the machine to search for a likely profile, as further described herein. The methods, systems and computer program products described herein can also implement calendar entries to determine when to schedule tasks. For example, the calendar entry may indicate when the user will be in a meeting. The methods, systems and computer program products described herein can implement a profile to guess when an "explicit" event occurs. For example, the methods, systems and computer program products described herein can set an instant message client to status "away" with a message "lunch", which provides a user application that tracks the state of a user. In another example, an explicit hint can be explicitly locking the computer screen and click a drop down from a list of likely (based on profiles) durations that user might be away, thereby allowing the user to choose a profile.

In exemplary embodiments, upon placing the machine in a suspend mode, the user can optionally specify an estimated time of suspend. Likewise, the methods, systems and computer program products described herein can implement dynamic tracking of user suspend periods as correlated with time of initiation to create "suspend profiles".

In exemplary embodiments, based on a policy manager invoked on power management events working in conjunction with firmware to read power states the computer may optionally select from a pool of deferrable work tasks. During the right conditions if all deferrable work is complete, the machine may volunteer cycles by communicating with a computational/workpool grid. In exemplary embodiments, power management tasks (such as determine the state and source the power) are the first ones to execute when a suspend mode is detected. If the machine only has a little battery power left and is not plugged in, then power conservation is desirable and tasks are not run. However, if there is sufficient power and a suspend period is going to be long, then the methods, systems and computer program products described herein can volunteer resource to the grid.

FIG. 1 illustrates an exemplary embodiment of a system 100 for generating suspend profiles and hinted suspending. The methods described herein can be implemented in software (e.g., firmware), hardware, or a combination thereof. In exemplary embodiments, the methods described herein are implemented in software, as an executable program, and is executed by a special or general-purpose digital computer, such as a personal computer, workstation, minicomputer, or mainframe computer. The system 100 therefore includes general-purpose computer 101.

In exemplary embodiments, in terms of hardware architecture, as shown in FIG. 1, the computer 101 includes a processor 105, memory 110 coupled to a memory controller 115, and one or more input and/or output (I/O) devices 140, 145 (or peripherals) that are communicatively coupled via a local input/output controller 135. The input/output controller 135 can be, for example but not limited to, one or more buses or other wired or wireless connections, as is known in the art. The input/output controller 135 may have additional elements, which are omitted for simplicity, such as controllers, buffers (caches), drivers, repeaters, and receivers, to enable communications. Further, the local interface may include address, control, and/or data connections to enable appropriate communications among the aforementioned components.

The processor 105 is a hardware device for executing software, particularly that stored in memory 110. The processor 105 can be any custom made or commercially available processor, a central processing unit (CPU), an auxiliary processor among several processors associated with the computer 101, a semiconductor based microprocessor (in the form of a microchip or chip set), a macroprocessor, or generally any device for executing software instructions.

The memory 110 can include any one or combination of volatile memory elements (e.g., random access memory (RAM, such as DRAM, SRAM, SDRAM, etc.)) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 110 may incorporate electronic, magnetic, optical, and/or other types of storage media. Note that the memory 110 can have a distributed architecture, where various components are situated remote from one another, but can be accessed by the processor 105.

The software in memory 110 may include one or more separate programs, each of which comprises an ordered listing of executable instructions for implementing logical functions. In the example of FIG. 1, the software in the memory 110 includes the suspend profiles and hinted suspending methods described herein in accordance with exemplary embodiments and a suitable operating system (OS) 111. The operating system 111 essentially controls the execution of other computer programs, such the suspend profiles and hinted suspending systems and methods described herein, and provides scheduling, input-output control, file and data management, memory management, and communication control and related services.

The suspend profiles and hinted suspending methods described herein may be in the form of a source program, executable program (object code), script, or any other entity comprising a set of instructions to be performed. When a source program, then the program needs to be translated via a compiler, assembler, interpreter, or the like, which may or may not be included within the memory 110, so as to operate properly in connection with the OS 111. Furthermore, the suspend profiles and hinted suspending methods can be written as an object oriented programming language, which has classes of data and methods, or a procedure programming language, which has routines, subroutines, and/or functions.

In exemplary embodiments, a conventional keyboard 150 and mouse 155 can be coupled to the input/output controller 135. Other output devices such as the I/O devices 140, 145 may include input devices, for example but not limited to a printer, a scanner, microphone, and the like. Finally, the I/O devices 140, 145 may further include devices that communicate both inputs and outputs, for instance but not limited to, a network interface card (NIC) or modulator/demodulator (for accessing other files, devices, systems, or a network), a radio frequency (RF) or other transceiver, a telephonic interface, a bridge, a router, and the like. The system 100 can further include a display controller 125 coupled to a display 130. In exemplary embodiments, the system 100 can further include a network interface 160 for coupling to a network 165. The network 165 can be an IP-based network for communication between the computer 101 and any external server, client and the like via a broadband connection. The network 165 transmits and receives data between the computer 101 and external systems. In exemplary embodiments, network 165 can be a managed IP network administered by a service provider. The network 165 may be implemented in a wireless fashion, e.g., using wireless protocols and technologies, such as WiFi, WiMax, etc. The network 165 can also be a packet-switched network such as a local area network, wide area network, metropolitan area network, Internet network, or other similar type of network environment. The network 165 may be a fixed wireless network, a wireless local area network (LAN), a wireless wide area network (WAN) a personal area network (PAN), a virtual private network (VPN), intranet or other suitable network system and includes equipment for receiving and transmitting signals.

If the computer 101 is a PC, workstation, intelligent device or the like, the software in the memory 110 may further include a basic input output system (BIOS) (omitted for simplicity). The BIOS is a set of essential software routines that initialize and test hardware at startup, start the OS 111, and support the transfer of data among the hardware devices. The BIOS is stored in ROM so that the BIOS can be executed when the computer 101 is activated.

When the computer 101 is in operation, the processor 105 is configured to execute software stored within the memory 110, to communicate data to and from the memory 110, and to generally control operations of the computer 101 pursuant to the software. The suspend profiles and hinted suspending methods described herein and the OS 111, in whole or in part, but typically the latter, are read by the processor 105, perhaps buffered within the processor 105, and then executed.

When the systems and methods described herein are implemented in software, as is shown in FIG. 1, the methods can be stored on any computer readable medium, such as storage 120, for use by or in connection with any computer related system or method. In the context of this document, a computer readable medium is an electronic, magnetic, optical, or other physical device or means that can contain or store a computer program for use by or in connection with a computer related system or method. The suspend profiles and hinted suspending methods described herein can be embodied in any computer-readable medium for use by or in connection with an instruction execution system, apparatus, or device, such as a computer-based system, processor-containing system, or other system that can fetch the instructions from the instruction execution system, apparatus, or device and execute the instructions. In exemplary embodiments, a "computer-readable medium" can be any means that can store, communicate, propagate, or transport the program for use by or in connection with the instruction execution system, apparatus, or device. The computer readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical), and a portable compact disc read-only memory (CDROM) (optical). Note that the computer-readable medium could even be paper or another suitable medium upon which the program is printed, as the program can be electronically captured, via for instance optical scanning of the paper or other medium, then compiled, interpreted or otherwise processed in a suitable manner if necessary, and then stored in a computer memory.

In exemplary embodiments, where the suspend profiles and hinted suspending methods are implemented in hardware, the suspend profiles and hinted suspending methods described herein can implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As described herein, the system 100 can include a suspend period management process that includes the ability to generate hinted suspending that indicates the commencement of a period of user inactivity, perform a task from a pool of deferrable work tasks during the period of user inactivity, and generate a suspend profile that includes a record for the period of user inactivity, and a time of day in which the period of user inactivity occurs.

FIG. 2 illustrates a flow chart of a method 200 for generating suspend profiles and hinted suspending in accordance with exemplary embodiments. At block 205, the system 100 detects a (hinted) suspend event in the computer system 100, the suspend event initiating the suspend period. At block 210, the system 100 informs the OS 111 of the event. At block 215, the system 100 detects the power state and source of the system 100. At block 220, the system 100 determines a probably period for the event. At block 225, the system 100 determines the tasks to perform in the system 100 during the suspend period of the system 100. As described above, in exemplary embodiments, a task may be defined by the system 100 or by the user or computational grid. In addition, a suspend period can be determined by the system as described herein by dynamically tracking the suspend events. Alternatively, the user can define the suspend period. At block 230, the determination of the tasks is based several factors, including, but not limited to power state/source of the system 100, the suspend period, explicit/implicit hint checks chosen from user-defined tasks the system selected and the grid. At block 235, the system 100 performs the tasks during the suspend period. In exemplary embodiments, blocks 220, 225, 230, 235 are repeated as necessary. At block 240, the system 100 detects a resume event in which the system is now out of the suspend mode. At block, the system can record the suspend period and create or update the suspend profile. In exemplary embodiments, the detection of the suspend event includes identifying a first time in which the input device of the computer system has been engaged, identifying a second time in which the input device of the computer system has been engaged and calculating a difference between the second time and the first time to determine a user inactivity period.

In exemplary embodiments, the system 100 can further record the time of day in which the user inactivity period occurs. Furthermore, the system 100 can define a hinted suspending event that notifies the computer system 100 that the user inactivity period is commencing. In exemplary embodiments, the time of day in which the user activity period occurs can determine an initiation of the hinted suspending event. The system 100 can further generate a suspend profile that can include a record for each of the suspend period, the user-inactivity period and the time of day in which the user inactivity period occurs and the hinted suspending event. In exemplary embodiments, the profile can include user tags, descriptions or names for explicit events (e.g., lunch, user asleep) In exemplary embodiments, the system 100 can further invoke power management tasks, which can include reading a power state of the computer system 100, selecting the task from a pool of deferrable work tasks, completing the task during the suspend period and volunteering processor cycles for power management events, which can occur in response to the pool of deferrable work tasks being complete.

Technical effects and benefits include the ability to implement suspend profiling in conjunction with implementation of hinted suspending to enable machines to make more intelligent decisions about deferred work, or work obtained dynamically during suitably located periods.

As described above, the embodiments of the invention may be embodied in the form of computer-implemented processes and apparatuses for practicing those processes. Embodiments of the invention may also be embodied in the form of computer program code containing instructions embodied in tangible media, such as floppy diskettes, CD-ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another.

The invention claimed is:

1. In a computer system having an input device, a suspend mode management method, comprising:
   monitoring user activity of the computer system to generate a suspend profile including a plurality of prior suspend periods by tracking the plurality of prior suspend periods occurring over an extended time period;
   utilizing the plurality of prior suspend periods to predict a hinted suspend event, each of the plurality of prior suspend periods being a period in which there is no user activity, the hinted suspend event indicating commencement of a period of user inactivity;
   determining a task in accordance with the hinted suspend event of the suspend profile to perform in the computer system during the period of user inactivity;
   dynamically detecting a current suspend event in the computer system, the current suspend event correlating to the hinted suspend event; and
   in response to the detecting of the current suspend event, reading a power state of the computer system by determining a power level of a battery of the computing system and whether the computing system is plugged in;
   in response to the power level being at a full power and the computing system being plugged in, performing the task during the period of user inactivity.

2. The method of claim 1, wherein the detecting of the prior suspend event in the computer system comprises:
   identifying a first time in which the input device of the computer system has been engaged;
   identifying a second time in which the input device of the computer system has been engaged; and
   calculating a difference between the second and first times to determine the period in which there is no user activity.

3. The method as claimed in claim 1 further comprising recording a time of day in which each of the plurality of prior suspend periods occur.

4. The method as claimed in claim 3 wherein the time of day in which the user activity period occurs determines an initiation of the hinted suspend event.

5. The method of claim 4, wherein the suspend profile includes a record for each of the plurality of prior suspend periods, the period in which there is no user activity, and the hinted suspend event after it has been predicted, and
   wherein each record for the user-inactivity period includes the time of day.

6. The method as claimed in claim 1 wherein the task is user-defined.

7. The method as claimed in claim 1 wherein one of the plurality of prior suspends period is user-defined.

8. The method of claim 1, further comprising:
   selecting the task from a pool of deferrable work tasks;
   completing the task during the period of user inactivity; and
   in response to the pool of deferrable work tasks being complete, volunteering processor cycles for power management events.

9. The method as claimed in claim 1 further comprising determining a power state of the computer system to determine an appropriate workload for the computer system.

10. A computer system, comprising:
    a processor;
    an input device operatively coupled to the processor; and
    a suspend period management process, having instructions to:
       monitor user activity of the computer system to generate a suspend profile including a plurality of prior suspend periods by tracking the plurality of prior suspend periods occurring over an extended time period;
       utilize the plurality of prior suspend periods to predict a hinted suspend event, wherein each of the plurality of prior suspend periods being a period in which there is no user activity, wherein the hinted suspend event indicating commencement of a period of user inactivity;
       determine a task in accordance with the hinted suspend event of the suspend profile to perform in the computer system during the period of user inactivity;
       dynamically detect a current suspend event in the computer system, wherein the current suspend event correlating to the hinted suspend event; and
       in response to the detection of the current suspend event, read a power state of the computer system by determining a power level of a battery of the computing system and whether the computing system is plugged in;
       in response to the power level determined to be at a full power and the computing system determined to be plugged in, perform the task during the period of user inactivity.

11. A computer program product for providing suspend mode management to a computer system having an input device, the computer program product comprising a computer readable storage medium having program instructions embodied therewith, the program instructions executable by a processor of the computer system to cause the processor to:
    monitoring user activity of the computer system to generate a suspend profile including a plurality of prior suspend periods by tracking the plurality of prior suspend periods occurring over an extended time period;
    utilizing the plurality of prior suspend periods to predict a hinted suspend event, each of the plurality of prior suspend periods being a period in which there is no user activity, the hinted suspend event indicating commencement of a period of user inactivity;
    determining a task in accordance with the hinted suspend event of the suspend profile to perform in the computer system during the period of user inactivity;
    dynamically detecting a current suspend event in the computer system, the current suspend event correlating to the hinted suspend event; and in response to the detecting of the current suspend event, reading a power state of the computer system by determining a power level of a battery of the computing system and whether the computing system is plugged in;
    in response to the power level being at a full power and the computing system being plugged in, performing the task during the period of user inactivity.

12. The computer program product of claim 11, wherein the detecting of the prior suspend event in the computer system comprises:
    identifying a first time in which the input device of the computer system has been engaged;

identifying a second time in which the input device of the computer system has been engaged; and calculating a difference between the second and first times to determine the period in which there is no user activity.

13. The computer program product as claimed in claim 12 wherein the method further comprises recording a time of day in which each of the plurality of prior suspend periods occur.

14. The computer program product as claimed in claim 13 wherein the time of day in which the user activity period occurs determines an initiation of the hinted suspend event.

15. The computer program product of claim 14, wherein the suspend profile includes a record for each of the plurality of prior suspend periods, the period in which there is no user activity, and the hinted suspend event after it has been predicted, and wherein each record for the user-inactivity period includes the time of day.

16. The computer program product as claimed in claim 11 wherein the task is user-defined.

17. The computer program product as claimed in claim 11 wherein one of the plurality of prior suspend periods is user-defined.

18. The computer program product of claim 11, wherein the method further comprises:

selecting the task from a pool of deferrable work tasks;

completing the task during the period of user inactivity; and in response to the pool of deferrable work tasks being complete, volunteering processor cycles for power management events.

* * * * *